United States Patent [19]
Gallagher

[11] 3,800,055
[45] Mar. 26, 1974

[54] PULSATING-FLOW COFFEE EXTRACTION PROCESS
[75] Inventor: William E. Gallagher, Cincinnati, Ohio
[73] Assignee: The Proctor & Gamble Company, Cincinnati, Ohio
[22] Filed: July 11, 1973
[21] Appl. No.: 378,370

Related U.S. Application Data
[63] Continuation of Ser. No. 153,535, June 16, 1971, abandoned.

[52] U.S. Cl. ............ 426/432, 23/267 C, 23/270 R
[51] Int. Cl. ............................................. A23f 1/08
[58] Field of Search............ 99/71; 23/267 C, 270.5

[56] References Cited
UNITED STATES PATENTS
2,709,643  5/1955  Peery ............................. 23/267 C
3,243,264  3/1966  Hickey ............................ 23/267 C
3,488,159  1/1970  Moon et al ...................... 23/267 C

OTHER PUBLICATIONS

Sivetz et al., Coffee Processing Technology, Vol. I, 1963, pp. 325, 365–369.

Primary Examiner—Frank W. Lutter
Assistant Examiner—William L. Mentlik

[57] ABSTRACT

A method for increasing the rate of extraction in a coffee extraction column which comprises superimposing a pulsating flow on the feed water of a conventional coffee extraction column.

6 Claims, 4 Drawing Figures

PATENTED MAR 26 1974      3,800,055

INVENTOR.
William E. Gallagher
BY Edmund J Sease
ATTORNEY 3,800,055

PULSATING-FLOW COFFEE EXTRACTION PROCESS

REFERENCE TO COPENDING APPLICATION

This application is a continuation of commonly assigned U.S. Pat. application Ser. No. 153,535, for A PULSATING-FLOW COFFEE EXTRACTION PROCESS, filed June 16, 1971, and now abandoned, in the name of William E. Gallagher.

BACKGROUND OF THE INVENTION

This invention relates to an improvement in the conventional countercurrent extraction process for producing soluble coffee. In the commercial production of soluble coffee, water is passed through multiple percolators or extraction columns containing roast and ground coffee to produce an aqueous coffee extract. The fresh water continually flows into a battery of columns, entering at the bottom of the column containing the most nearly spent coffee grounds and passing in series through progressively fresher coffee columns. Periodically, extract is withdrawn from the column containing the freshest coffee. The number of columns in a countercurrent extraction system can be varied from about 4 to about 12, but more practically from about 5 to about 8.

The prior art is replete with general disclosures on methods for improving the efficiency of contact in certain types of countercurrent flow systems by introducing a pulsating flow into the system. U.S. Pat. No. 2,704,643, Contacting Liquids with Solids, N. E. Peery, patented May 31, 1955, discloses the introduction of pulsating-flow into a column for contacting liquids, such as hydrocarbon oils or water, with solids, such as platinum-aluminum fluoride catalysts or silica gels. U.S. Pat. No. 3,488,159, Jet-Pulsed Liquid-Liquid Extraction Column, Joon S. Moon and Theodore Vermeulen, patented Jan. 6, 1970, shows the introduction of pulsating flow into a liquid-liquid extraction column. However, no reference teaches the use of pulsating flow in a coffee extraction column in order to improve the efficiency of mass transfer within the column.

It is an object of this invention to increase the rate of extraction in the conventional coffee extraction process. This and other objects will become apparent from the description that follows.

SUMMARY OF THE INVENTION

This invention relates to the production of instant coffee, and more particularly to an improved countercurrent coffee extraction process. The rate of extraction in the coffee extraction column is increased by superimposing a pulsating flow on the feed water to a coffee extraction column. The pulsating flow can have a frequency of from about 0.5 to 30 cycles per minute, and an amplitude (the units of which are volume per cycle) of about one-thirtieth to about one-third the average flow rate in volume per minute. BRIEF DESCRIPTION OF THE DRAWINGS FIGS. 1, 2, and 3 illustrate how pulsing the flow can cause the fluid velocity to slow down (in FIG. 1), to become zero (in FIG. 2), or to reverse (in FIG. 3). FIG. 4 shows a diagram of the preferred embodiment of this invention.

DETAILED DESCRIPTION OF THE INVENTION

This invention relates to an improvement in the production of soluble coffee extract by the process wherein extracting fluid is passed through multiple extraction columns containing roast and ground coffee. By this process the extracting fluid continually flows in series through a plurality of columns, entering at the bottom of a column containing the most nearly spent coffee, exiting at the top of this column, and thereafter passing in a similar fashion through the columns of progressively fresher coffee. Periodically, extract is withdrawn from the column containing the freshest coffee, i.e., the fresh extraction column or the first coffee stage, the two terms being used interchangeably herein. The process of this invention is concerned with an improvement over the above described conventional coffee extraction process wherein the rate of extraction is increased by superimposing a pulsating flow on the feed water.

Figure 1:
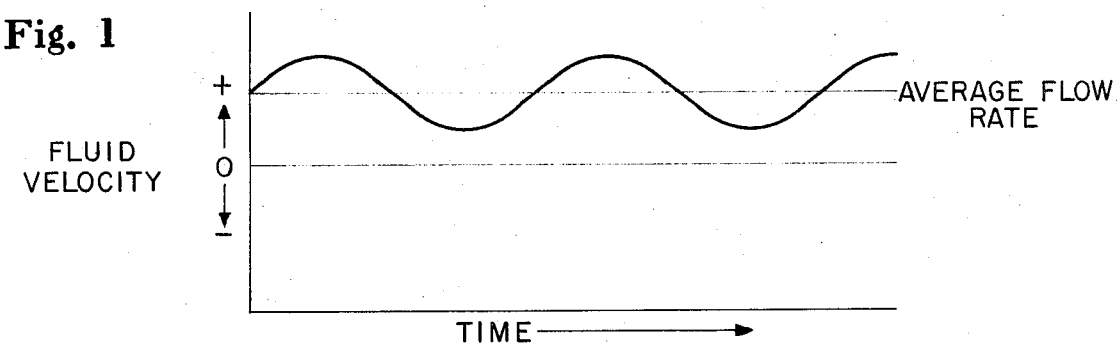
Figure 2:
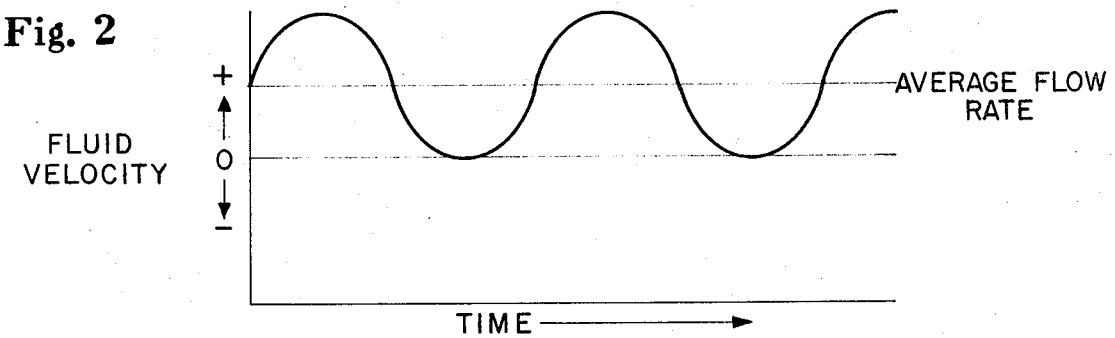
Figure 3:
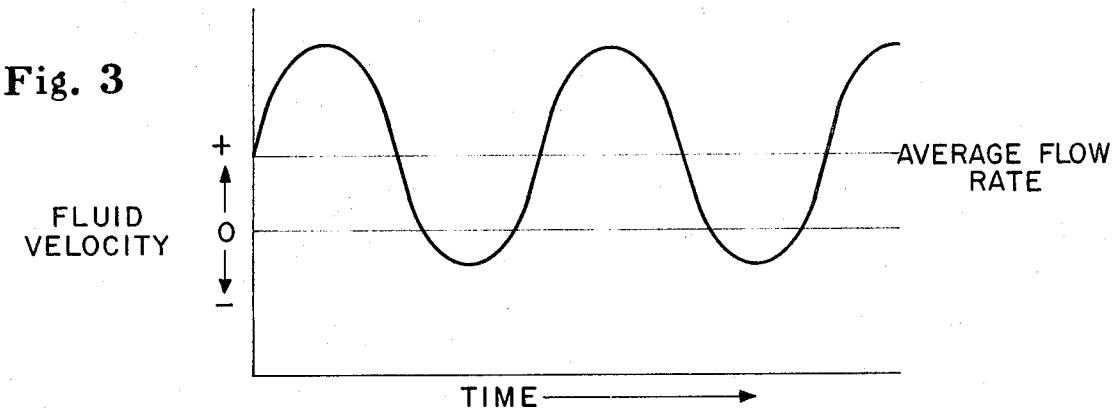

It has been unexpectedly found that causing the feed water to a coffee extraction column to exhibit pulsating flow will result in a substantial increase in the rate of extraction. In the present system, the use of pulsating flow means that the velocity of the feed water relative to the roast and ground coffee is alternately increased and decreased to above and below the average flow rate. FIGS. 1, 2, and 3 illustrate the velocity at any time for a fluid pulsing through a column. In FIG. 1 the velocity is always positive, in FIG. 2 the magnitude of the velocity is such that it becomes zero once during each cycle, and FIG. 3 illustrates a pulse which reverses the flow once during each cycle. This phenomenon goes on throughout the column. It is theorized that the pulsating flow causes an increase in the rate of mass transfer between the coffee granules and the extraction water, thereby increasing the rate of extraction and the yield.

The frequency of the pulsating flow can be varied from about 0.5 to about 30 cycles per minute. No significant effect is noticed at lower frequencies and there is very little increase in the rate of extraction when the frequency is raised above 30 cycles per minute. The absolute value of the amplitude of the pulsating flow (in volume per cycle) is from about one-thirtieth to about one-third the absolute value of the average flow rate (in volume per minute). At lower amplitudes, there is no noticeable effect on the rate of extraction and there is very little advantage in increasing the amplitude to more than about one-third the average flow rate. Preferably, the frequency should be from about 1 to about 10 cycles per minute, and the amplitude should be from about one-twelth to about one-fourth the average flow rate.

"Plugging" is a common problem in coffee extraction columns. It refers to the phenomenon which sometimes occurs when the liquid velocity in the column gets too high, and generally occurs in the more nearly spent columns. When plugging occurs, the feed water is blocked from flowing through the column. It appears that high amplitudes and frequencies of pulsating flow in the feed water tend to cause plugging to occur earlier than if there was no pulsation in the flow. The technique of using pulsating flow in the feed water can be used in any or all of the columns in the extraction train. Most preferably, it is only used in the first column, the fresh extraction column, because of the plugging problem. In the fresh extraction column, the draw-off ratio (amount of extract withdrawn compared to the weight of the coffee in the columns) is low enough, usually from about 1 to 3, so that plugging does not present a real problem in this column.

The amplitude and the frequency of the pulsation both effect the rate of extraction, but the effects of amplitude and frequency cannot be determined separatedly — they are interdependent. To more particularly describe this invention, and because amplitude and frequency are interdependent, the applicant has devised the Kinetic Ratio number, a dimensionless number which represents the ratio of the kinetic energy of the extracting fluid during pulsating flow to the kinetic engergy of the extracting fluid during normal flow. Normal flow is herein defined as the flow when pulsing is not used. Comparative kinetic engergies are utilized here because they are convenient and because what pulsating the flow appears to do is to increase the kinetic energy of the extracting fluid. Kinetic energy is directly related to turbulence, which theoretically is directly related to mass transfer, which is directly related to the rate of extraction. The average kinetic energy of the extracting fluid during pulsating flow can be obtained by taking an average of the kinetic energies at the highest and lowest points of each cycle. When the amplitude is multiplied by the frequency, the pulsating velocity is obtained. The following formula shows how to obtain the Kinetic Ratio number:

$$N = \frac{\left(\frac{m(Q+aw)^2}{2} + \frac{m(Q-aw)^2}{2}\right)}{\frac{mQ^2}{2}} = \frac{a^2w^2}{Q^2} + 1$$

where $a$ is the amplitude of the pulsation, $w$ is the frequency of the pulsation, $m$ is the mass of the extracting fluid, $Q$ is the average volumetric flow rate of the fluid if there were no pulsation, i.e., during normal flow, and $N$ is the Kinetic Ratio number. N can range from about 1.1 to about 25. If N is less than about 1.1, then the pulsating flow has very little effect upon the rate of extraction. There is very little increase in the rate of extraction when the Kinetic Ratio number is raised above 25. When there is no pulsation, the Kinetic Ratio number is 1.

Figure 4:
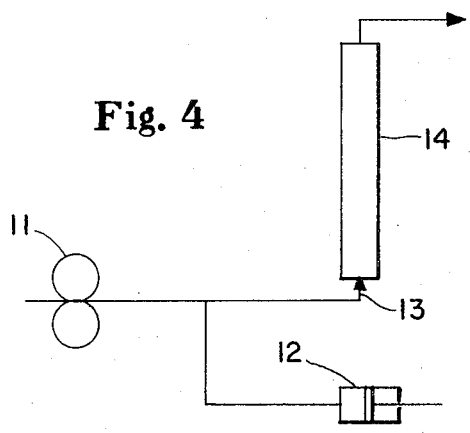

Any method of introducing pulsating flow can be used in the practice of this invention. A preferred method is to use a second pump with a piston-chamber arrangement suitable for water displacement. This is illustrated in FIG. 4. While a positive displacement pump 11 drives the fluid through the extraction column 14, a second piston pump 12 creates the pulse by alternately withdrawing water from the feed line 13 and forcing it back into the feed line 13. When the piston moves back, the chamber fills with water, drawing it out of the flow, and causing the downward portion of the pulse. When the piston moves forward, it forces the water in the chamber back into the flow and causes the upward or higher velocity portion of the pulse. The pump may be located in the feed water line, at the bottom of the column, or there may be several pumps spaced at intervals along the column.

A brief description of a typical countercurrent coffee extraction system of which this invention forms an improved part is included herein to illustrate the operation of this invention. The operation of such a system is well understood and many modifications and variations will be apparent to those skilled in the art from the description and examples that follow.

A plurality of extraction columns filled with roast and ground coffee are connected in series by piping between the individual columns. Typically, six columns are found in the countercurrent extraction system, and therefore this description is given with reference to a six-column system. The last three columns, i.e., those containing the most nearly spent coffee grounds, are referred to collectively as the hydrolysis columns, while the next two columns which contain coffee grounds of an intermediate degree of spentness are the extracting columns, with the first column which contains the freshest coffee grounds being referred to as the fresh extraction column. As above noted, the extraction columns are intended to be used with roast and ground coffee; however, it should be realized that they can be adapted to the extraction of whole coffee beans.

The extracting fluid, which can be either water or a dilute aqueous coffee extract obtained from another source, enters the column containing the most nearly spent coffee grounds at the lower extremity of the column and is discharged at the top of the column. The outlet line from one column is directly connected to the inlet line of the next column. The extracting fluid progresses from column to column in the series entering each column at the bottom and being discharged from the top. Heat exchangers are fitted in the lines between the columns immediately prior to the extraction liquid inlet to the columns. The heat exchangers can be used when required to achieve or to maintain the hydrolysis temperature, i.e., about 320° to 360° F in the hydrolysis columns of the extraction system. They can also be used in the extraction columns to cool or to heat the extraction liquid to any desired extracting temperature, i.e., usually within the range of from 270° to 310° F. Each column is fitted with a means for charging the column with roast and ground coffee, for discharging the coffee from the column, and for keeping the coffee in the column during the overall extraction cycle. The column which the extract liquor enters just prior to being withdrawn from the system contains the freshest coffee. It is with respect to the conditions that are maintained within the fresh extraction column that the preferred embodiment of this invention is concerned.

In most systems, an extra column is provided in each series so that the extraction operation is not interrupted while the most nearly spent coffee column is being emptied and refilled. The extra column is a standby column which is cut into the system either slightly before or simultaneously with the removal of the most nearly spent coffee column.

In the operation of a coffee extraction system, aqueous extract is drawn off at a draw-off ratio of about 1 to 3. As is well known to those skilled in the art, the draw-off ratio is the amount of extract withdrawn from the fresh extraction column compared to the average weight of coffee in the individual columns. Preferably, a draw-off ratio of 1.7 to 2.3 is employed.

After extract is drawn off from the fresh extraction column, a new column containing fresh roast and ground coffee is cut into the system with the original fresh extraction column becoming the next succeeding stage, and so on to the point where the column that originally contained the most nearly spent coffee, is removed from the system. The column removed from the system is cleared of the spent coffee grounds and charged with fresh roast and ground coffee to now become the standby fresh extraction column.

After emission from the extraction system, the extract is preferably concentrated to at least 45 percent solubles concentration and preferably to 50 percent solubles concentration, and then dried by well known spray drying, freeze drying, or drum drying techniques. The flavor, taste, and aroma of the dried product can be supplemented by the addition of coffee oil or by the addition of a steam distillate either before or after drying by any one of a number of known methods.

The following Examples are meant only to illustrate the invention and not to limit it in any way.

EXAMPLE I

In a typical operation according to my process and employing an apparatus which comprises a positive displacement pump which pumps water into the bottom of a coffee extraction column and a plunger within a cylinder which is connected to the feed water stream between the pump and the column, the operating conditions are as follows.

The vertical extraction column, which is 30 inches long and 2 inches in diameter, is filled with 1.2 lbs. of roasted and ground coffee. Water at room temperature is pumped into the bottom of the column at 5.73 cubic centimeters per second by a positive displacement pump. As the water flows into the column, a 50 cubic centimeter syringe is quickly filled with water by removing the plunger to displace with water the air in the syringe and the line leading to the syringe. The plunger is replaced and moved back and forth smoothly, taking about five seconds to fill the syringe and about five seconds to empty it.

The liquid in the column will pulse up and down at an amplitude of 50 cubic centimeters per cycle, a frequency of 6 cycles per minute, and a Kinetic Ratio number of 1.761.

The extract leaving the top of the column is collected. At a draw-off ratio of 1.0, the yield is 4.7 pounds of solubles extracted per 100 pounds of coffee in the column. In a nonpulsating flow system, the yield is 4.1 pounds. Thus, the rate of extraction is increased about 15 percent.

EXAMPLE II

The procedure of Example I is repeated for a flow rate of 5.13 cubic centimeters per second, an amplitude of 50 cubic centimeters per cycle, a frequency of 22 cycles per minute, and a Kinetic Ratio number of 13.8. The yield at a draw-off ratio of 1.0 is 5.0 pounds of solubles extracted per 100 pounds of coffee in the column, an increase of about 22 percent in the rate of extraction.

EXAMPLE III

In a typical operation according to my process a pilot plant extraction train, consisting of seven columns, is utilized. The process is first operated sufficiently long to insure that a truly countercurrent progression of grounds and extract liquor exists before taking data and testing extract draw-offs. This is accomplished by sequentially adding columns to the process until the total is six operating columns. As the extract draw-off begins from the first fresh column, the column containing the most nearly spent coffee is taken out of the process, emptied, and refilled to be used again. This procedure is known in the art as startup.

A blend of 24.4 percent Primes, 60.2 percent Brazils, 9.4 percent Arabicas, and 6 percent Robustas is roasted and ground. An average weight of 19.1 pounds of the roasted and ground coffee is placed in each column. Each column is 5 feet in length and 6 inches in diameter.

After startup, the temperatures in the extraction train starting with the column containing the most spent coffee grounds and progressing to the fresh extraction column, as measured at the inlet to each column and recorded at the beginning of extract drawoff, are as follows: 353°, 344°, 339°, 335°, and 278° F. The temperature of the extract being drawn off the fresh extraction column is about 209° F. A pressure of about 150 psig is maintained on the columns. The flow rate of water through columns is 4 pounds per minute or 0.064 cubic feet per minute. A pulsating flow with an amplitutde of 0.011 cubic feet per cycle and a frequency of 6 cycles per minute is superimposed upon the fresh extraction column by a pump which is connected to the inlet stream of the fresh extraction column. The Kinetic Ratio number is 2.06, the drawoff ratio is 1.92, and the average cycle time is 20.1 minutes. The vapors from the frssh extraction column are condensed and the entire extract is cooled to 50° F by passing the fresh column extract through a chilled water heat exchanger. The fresh extraction column is exhausted through the chilled water heat exchanger to an open weigh tank. The percentage yield solubles based on the roast and ground coffee is 51 percent by weight whereas without pulsing the yield is 44 percent by weight. This represents a 16 percent increase in the rate of extraction in the fresh column.

The extract is concentrated to 50 percent by thin film evaporation and spray-dried to produce a soluble coffee product. Freeze-drying or any other conventionally used drying process for soluble coffee may be used.

What is claimed is:

1. A process for increasing the rate of extraction in a continuous countercurrent coffee extraction process which comprises passing an extracting fluid continuously through a plurality of extraction columns containing ground coffee; and superimposing a pulsating flow onto said extracting fluid, thereby to cause pulsating flow; said pulsating flow having a frequency of from 0.5 to 30 cycles per minute, an amplitude ranging from one-thirtieth to one-third of the average flow rate of the extracting fluid and a Kinetic Ratio Number ranging from 1.1 to 25.

2. The process of claim 1 wherein the pulsating flow is superimposed on the extracting fluid of the extraction process by means of one or more pumps with a piston-chamber arrangement suitable for water displacement.

3. In a continuous countercurrent coffee extraction process wherein an extracting fluid is passed through a plurality of extraction columns containing ground coffee and coffee extract is withdrawn from a fresh extraction column thereof, the improvement which comprises increasing the rate of extraction by superimposing a pulsating flow onto the extracting fluid of the extraction process, thereby to cause pulsating flow; said pulsating flow having a frequency of from 0.5 to 30 cycles per minute, an amplitude ranging from one-thirtieth to one-third of the average flow rate of the extracting fluid and a Kinetic Ratio Number ranging from 1.1 to 25.

4. The process of claim 3 wherein the pulsating flow is superimposed only on the extracting fluid of a fresh extraction column.

5. The process of claim 4 wherein the frequency of the pulsating flow is from 1 to 10 cycles per minute, the amplitude ranges from 1/12 to ¼ the average flow rate of the feed water, and the Kinetic Ratio Number ranges from 1.1 to 25.

6. The process of claim 4 wherein the pulsating flow is superimposed on the extracting fluid of a fresh extraction column by means of one or more pumps with a piston-chamber arrangement suitable for water displacement.

* * * * *